United States Patent
Didey et al.

(10) Patent No.: US 10,093,413 B2
(45) Date of Patent: Oct. 9, 2018

(54) DRIVE SYSTEM FOR AIRCRAFT LANDING GEAR

(71) Applicant: AIRBUS OPERATIONS LIMITED, Bristol (GB)

(72) Inventors: Arnaud Didey, Bristol (GB); Fraser Wilson, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 215 days.

(21) Appl. No.: 15/118,779

(22) PCT Filed: Feb. 13, 2015

(86) PCT No.: PCT/GB2015/050414
§ 371 (c)(1),
(2) Date: Aug. 12, 2016

(87) PCT Pub. No.: WO2015/121671
PCT Pub. Date: Aug. 20, 2015

(65) Prior Publication Data
US 2017/0050724 A1    Feb. 23, 2017

(30) Foreign Application Priority Data

Feb. 13, 2014 (GB) .................................. 1402501.9
Feb. 13, 2014 (GB) .................................. 1402518.3

(51) Int. Cl.
*B64C 25/40* (2006.01)
*F16H 55/10* (2006.01)
(Continued)

(52) U.S. Cl.
CPC ............ *B64C 25/405* (2013.01); *B64C 25/34* (2013.01); *F16H 1/20* (2013.01); *F16H 55/10* (2013.01);
(Continued)

(58) Field of Classification Search
CPC ....... B64C 25/34; B64C 25/40; B64C 25/405; F16H 1/06; F16H 1/20; F16H 1/24;
(Continued)

(56) References Cited

U.S. PATENT DOCUMENTS 3,977,631 A    8/1976  Jenny
4,659,039 A *  4/1987  Valdes .................. B64C 25/405
                                                         244/103 S
(Continued)

FOREIGN PATENT DOCUMENTS

EP    2527249 A1    11/2012
WO    0146605 A1    6/2001
(Continued)

OTHER PUBLICATIONS

Hiroshi Honda and Hiroshi Makino, "Research on the Trochoidal Gears (1st Report): Classification and Basic Formulas of the Trochoidal Gears". Translation of Journal of the Japan Society for Precision Engineering, 1994, vol. 30, No. 7, p. 949-953.
(Continued)

*Primary Examiner* — Valentina Xavier
(74) *Attorney, Agent, or Firm* — Nixon & Vanderhye P.C.

(57) ABSTRACT

A drive system for rotating a wheel of an aircraft landing gear is disclosed including a motor operable to rotate a drive pinion via a drive path; and a driven gear adapted to be attached to the wheel so as to be capable of rotating the wheel. The drive system has a drive configuration in which the drive pinion is capable of meshing with the driven gear to permit the motor to drive the driven gear via the drive path. The drive path includes a first compensating gear mounted on a common drive shaft with the drive pinion so as to be capable of rotating in tandem with the drive pinion, and a second compensating gear which is meshed with the first compensating gear.

17 Claims, 12 Drawing Sheets

(51) Int. Cl.
*F16H 57/00* (2012.01)
*B64C 25/34* (2006.01)
*F16H 1/20* (2006.01)
*F16H 55/30* (2006.01)
*F16H 35/00* (2006.01)

(52) U.S. Cl.
CPC ......... *F16H 55/30* (2013.01); *F16H 57/0006* (2013.01); *F16H 2035/003* (2013.01); *F16H 2057/0012* (2013.01); *Y02T 50/823* (2013.01)

(58) Field of Classification Search
CPC ...... F16H 55/30; F16H 55/10; F16H 57/0006; F16H 2057/0012; F16H 2035/003; Y10T 74/19684; Y02T 50/823
See application file for complete search history.

(56) References Cited

U.S. PATENT DOCUMENTS

| | | | |
|---|---|---|---|
| 2012/0153075 A1* | 6/2012 | Wilson | B64C 25/405 244/50 |
| 2012/0312112 A1 | 12/2012 | Tizac | |
| 2014/0225421 A1* | 8/2014 | Oswald | B64C 25/405 301/6.2 |
| 2014/0245853 A1 | 9/2014 | Didey | |
| 2015/0314862 A1* | 11/2015 | Blanc | B64C 25/405 244/103 S |

FOREIGN PATENT DOCUMENTS

| | | |
|---|---|---|
| WO | 2011023505 A2 | 3/2011 |
| WO | 2012171589 A1 | 12/2012 |
| WO | 2014023939 A1 | 2/2014 |

OTHER PUBLICATIONS

Hiroshi Honda, "Research on the Trochoidal Gears (2nd Report): Pressure Angle of Trochoidal Gears and Modification of Tooth Profile". Translation of Journal of the Japan Society for Precision Engineering, 1995, vol. 61, No. 2, p. 208-212.
International Search Report and Written Opinion of the ISA dated May 6, 2015 International Application No. PCT/GB2015/050414.

* cited by examiner

DRIVE SYSTEM FOR AIRCRAFT LANDING GEAR

RELATED APPLICATIONS

The present application is a National Phase of International Application Number PCT/GB2015/050414, filed Feb. 13, 2015, which claims priority from Great Britain Application Number 1402501.9, filed Feb. 13, 2014, and Great Britain Application Number 1402518.3, filed Feb. 13, 2014.

FIELD OF THE INVENTION

The present invention relates to a drive system for rotating one or more wheels of an aircraft landing gear for the purposes of ground taxiing and/or spin-up prior to landing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

SUMMARY OF THE INVENTION

A first aspect of the invention provides a drive system for rotating a wheel of an aircraft landing gear, the drive system including: a motor operable to rotate a drive pinion via a drive path; and a driven gear adapted to be attached to the wheel so as to be capable of rotating the wheel, wherein: the drive system has a drive configuration in which the drive pinion is capable of meshing with the driven gear to permit the motor to drive the driven gear via the drive path; the drive path comprises a first compensating gear and a second compensating gear which is meshed with the first compensating gear, one of the drive pinion and the driven gear comprises a roller gear having a series of rollers arranged to form a ring, each roller being rotatable about a roller axis, and the other of the drive pinion and the driven gear comprises a sprocket; and one of the first compensating gear and the second compensating gear comprises a roller gear having a series of rollers arranged to form a ring, each roller being rotatable about a roller axis, and the other of the first compensating gear and the second compensating gear comprises a sprocket.

By providing the drive pinion and driven gear as a roller gear and sprocket (or sprocket and roller gear), several advantages are achieved over a conventional toothed gear arrangement. In particular, the roller gear and sprocket may be especially tolerant of distortion of the landing gear wheel during use, and misalignment between the drive pinion and driven gear caused by bending of the wheel axle. However, the inventor has identified that a problem with a sprocket-roller gear arrangement is that a variation in roller gear rotational speed occurs with each tooth to roller engagement and disengagement. That is, the torque transfer from the drive pinion to the driven gear is not smooth, but is instead subject to cyclical variations. This torque/velocity variation, or transmission error, may lead to undesirable vibration within the landing gear during operation of the drive system.

The present invention provides a solution in the form of the drive path. Thus, vibrations caused by fluctuations in the transfer of torque between the drive pinion and the driven gear can be isolated within the common drive shaft, and prevented from being transmitted through the drive train to the landing gear by the compensating torque fluctuations between the first and second compensating gears.

The term roller gear is used to denote a gear formed from a plurality of rotatable rollers arranged to form a (circular) ring. Each roller is typically rotatable about a pin, which is typically fixed at at least one end to an annular ring member. Such a gear may alternatively be referred to as a pin gear.

In the drive system of the first aspect the drive path may be configured such that either: the drive pinion and the first compensating gear each comprise a roller gear having a series of rollers arranged to form a ring, each roller being rotatable about a roller axis, and the driven gear and the second compensating gear each comprise a sprocket; or the drive pinion and the first compensating gear each comprise a sprocket and the driven gear and the second compensating gear each comprise a roller gear having a series of rollers arranged to form a ring, each roller being rotatable about a roller axis.

In this way, the type of engagement between the first and second compensating gears may be opposite to, i.e. mirror, the type of engagement between the drive pinion and the driven gear. That is, the sprocket of the second compensating gear may be arranged to drive the roller gear of the first compensating gear, while the sprocket driven gear is arranged to be driven by the roller gear of the drive pinion, or vice versa. These opposing engagement types provide a phase shift between the compensating gear engagement and the drive pinion and driven gear engagement, the phase shift tending to cause the torque fluctuations of the compensating gear engagement tending to counteract (or at least partially cancel out) the torque fluctuations of the drive pinion and driven gear engagement.

The drive system is preferably configured such that, when the motor drives the driven gear via the drive path in the drive configuration, there is a first oscillation in torque transmitted from the drive pinion to the driven gear and a second oscillation in torque transmitted from the second compensating gear to the first compensating gear, the second oscillation tending to counteract the first oscillation.

The drive system is preferably configured such that the second oscillation has a maximum which coincides with a minimum in the first oscillation, or vice versa (i.e. the second oscillation is offset in phase from the first oscillation). This may be achieved by, for example, configuring the drive path such that the type of engagement between the first and second compensating gears may be opposite to the type of engagement between the drive pinion and the driven gear, as discussed above.

The first and second oscillations are preferably each periodic, and a period of the first oscillation is preferably an integer multiple of a period of the second oscillation. In some embodiments the oscillations may have substantially the same period (i.e. frequency), for example by providing substantially the same tooth pitch at the first and second compensating gears as at the drive pinion and driven gear, as discussed below.

As an example, the driven gear may be a sprocket/roller gear with 48 teeth/rollers and the drive pinion may be a roller gear/sprocket with 11 rollers/teeth. This could be compensated by a first compensating gear being a roller gear/sprocket with 11 rollers/teeth and a second compensating gear being a sprocket/roller gear with 48 teeth/rollers. In this example, the "driven gear-drive pinion-first compensating gear-second compensating gear" arrangement forms a "mirror image" of rollers/teeth.

As an alternative example, the driven gear may be a sprocket/roller gear with 48 teeth/rollers and the drive pinion may be a roller gear/sprocket with 12 rollers/teeth. This could be compensated by a first compensating gear being a roller gear/sprocket with 6 rollers/teeth and a second compensating gear being a sprocket/roller gear with 24 teeth/rollers. In this alternative example, the ration of teeth/rollers of the driven gear and drive pinion (48:12=4:1) is the same as the ratio of teeth/rollers of the second compensating gear and first compensating gear (24:6=4:1). However, the "driven gear-drive pinion-first compensating gear-second compensating gear" arrangement does not form a "mirror image" of rollers/teeth. Instead, the ratio of teeth/rollers of the driven gear and second compensating gear is an integer multiple of 2:1 (48:24) and the ratio of teeth/rollers of the drive pinion and first compensating gear is the same integer multiple of 2:1 (12:6). In this alternative example, it is important that the amplitude of the torque oscillation is similar between the first and second compensating gears as between the drive pinion and driven gear. This requires careful geometry design of the smaller teeth/rollers (on the drive pinion and drive gear), as they are a different size to the larger teeth/rollers (on the first and second compensating gears) and may be adversely affected by contact bearing pressure and roller thickness etc.

The second compensating gear may have fewer teeth or rollers, respectively, than the first compensating gear to achieve a gear reduction ratio. This may be advantageous in ground taxiing applications of the drive system.

The drive path is preferably configured such that, in the drive configuration, each tooth to roller engagement between the first compensating gear and the second compensating gear is out of phase with each tooth to roller engagement between the drive pinion and the driven gear. In this way, the torque fluctuations of the tooth to roller engagements of the drive pinion and driven gear may be at least partially cancelled out, or counteracted, by the torque fluctuations of the tooth to roller engagements of the first and second compensating gears.

In some embodiments the out of phase tooth to roller engagement may be achieved by mounting the first compensating gear on the common drive path such that it is out of rotational alignment with the drive pinion.

A pitch between rollers or teeth, respectively, of the drive pinion and driven gear may be substantially equal to a pitch between rollers or teeth, respectively, of the first compensating gear and second compensating gear. In this way, the torque fluctuations caused by the tooth to roller engagements of the first and second compensating gears may have substantially the same period (i.e. frequency) as the tooth to roller engagements of the drive pinion and driven gear.

The rollers of the drive pinion or driven gear preferably have substantially the same profile, i.e. shape, as the rollers of the first compensating gear or second compensating gear. In addition, or alternatively, the teeth of the drive pinion or driven gear preferably have substantially the same profile as the teeth of the first compensating gear or second compensating gear. Thus, the torque fluctuations caused by the tooth to roller engagements of the first and second compensating gears may have substantially the same amplitude variations as the tooth to roller engagements of the drive pinion and driven gear.

In preferred embodiments the drive system is switchable between the drive configuration and a neutral configuration in which the drive pinion is not capable of meshing with the driven gear. In this way, the wheel can rotate freely with the drive system is not engaged, for example during take-off and landing of the aircraft.

Preferably, the first compensating gear is mounted on a common drive shaft with the drive pinion so as to be capable of rotating in tandem with the drive pinion.

A second aspect of the invention provides an aircraft landing gear comprising a wheel and a drive system according to the first aspect, wherein the driven gear of the drive system is attached to the wheel so as to be capable of rotating the wheel.

A third aspect of the invention provides a method of rotating a wheel of an aircraft landing gear with the drive system of the first aspect, the method comprising: operating the motor to drive the driven gear via the drive path; transmitting torque from the drive pinion to the driven gear, wherein there is a first oscillation in the torque transmitted from the drive pinion to the driven gear; and transmitting torque from the second compensating gear to the drive pinion via the first compensating gear and the common drive shaft, wherein the first and second compensating gears introduce a second oscillation in the torque transmitted from the second compensating gear to the drive pinion which tends to counteract the first oscillation.

All of the optional, or desirable, features of the invention described herein may be applied to any aspect of the invention, either alone or in any combination.

BRIEF DESCRIPTION OF THE DRAWINGS

Embodiments of the invention will now be described with reference to the accompanying drawings, in which.

DETAILED DESCRIPTION OF EMBODIMENT(S)

The illustrated embodiments are shown applied to an aircraft landing gear which has two wheels, but the principles of the embodiments may be applied to landing gear with any number of wheels including only a single wheel. The embodiments are applied to a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

Figure 1:
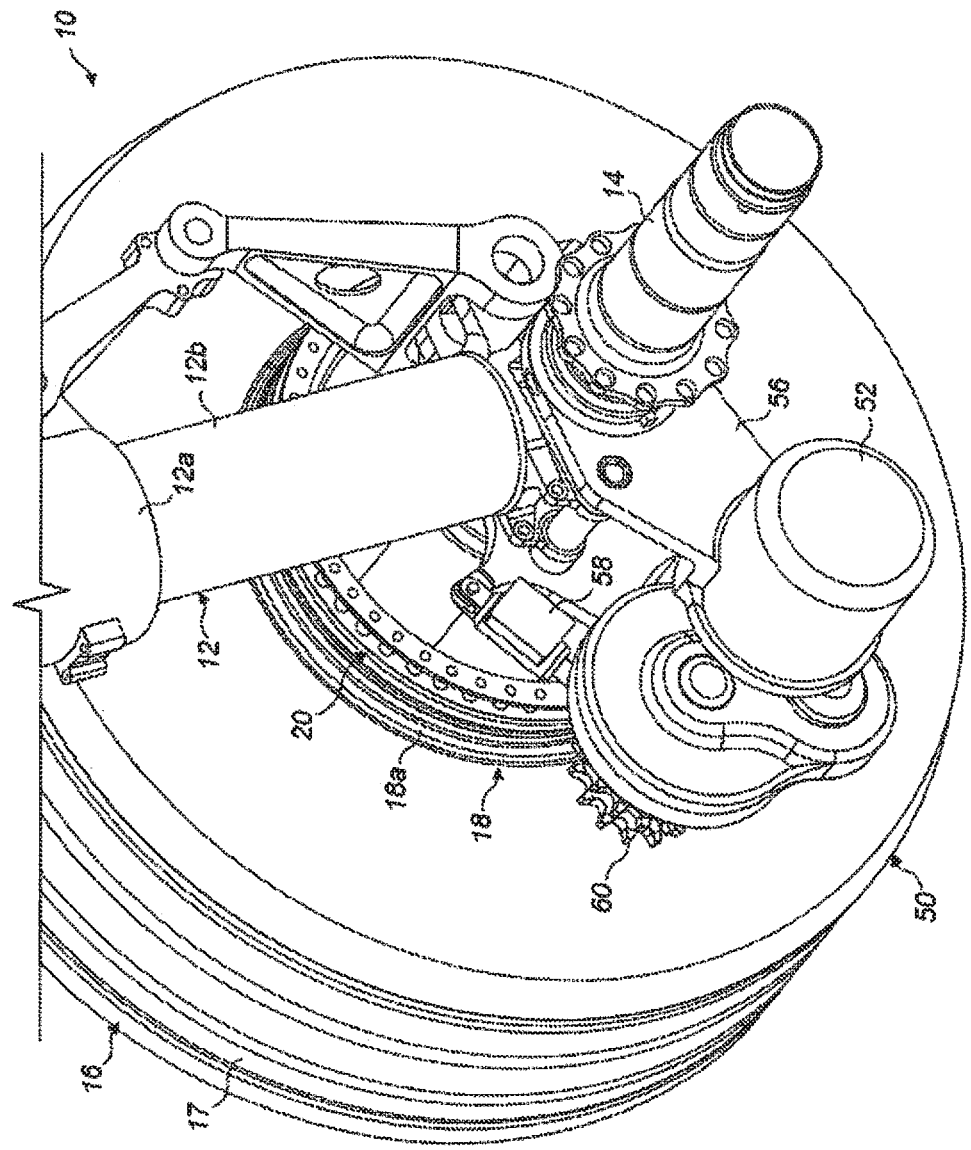
FIG. 1 shows an isometric view of a drive system according to a first embodiment.
Figure 2:
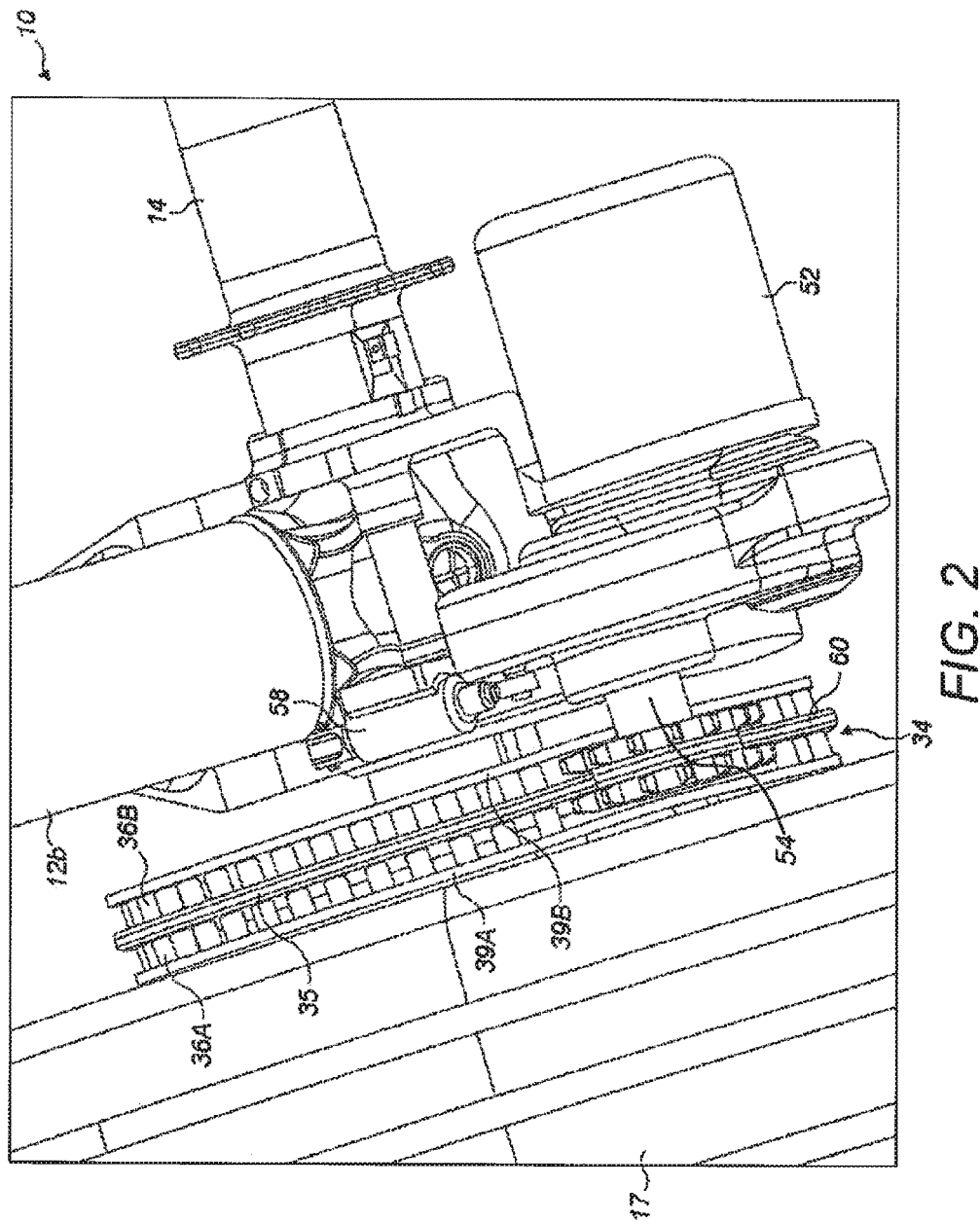
FIG. 2 shows a further isometric view of the drive system of FIG. 1.

The landing gear 10 includes a telescopic shock absorbing main leg 12, including an upper telescopic part 12a (main fitting) and a lower telescopic part 12b (the slider). The upper telescopic part 12a is attached to the aircraft fuselage or wing (not shown) by its upper end (not shown). The lower telescopic part 12b supports an axle 14 carrying a pair of wheels 16, one on either side of the main leg (only one wheel 16 is shown in FIGS. 1 and 2, for clarity). The wheels 16 are arranged to rotate about the axle 14 to enable ground movement of the aircraft, such as taxiing or landing.

Each wheel 16 comprises a tyre 17 supported by a hub 18 having a rim 18a at its outer edge which holds the tyre 17. A driven gear 20 is attached to the hub 18 (preferably at the rim 18a) so as to be rotatable with the wheel 16. The driven gear 20 may be attached to the wheel 16 by a plurality of discrete couplings, which may provide a rigid or flexible attachment. Alternatively, the attachment may be via a flange forming a continuous extension rim projecting axially from either the wheel 16 or the driven gear 20.

The drive system 50 includes a motor 52 which transmits torque to a drive shaft 54 via a gearbox 70. The drive system 50 is supported by a bracket 56 which is rigidly connected to the axle 14 of the landing gear. The bracket 56 includes two lugs comprising half moon clamps to permit ready attachment and detachment of the bracket 56 to the axle 14. The motor 52 is fixedly connected, e.g. by bolting, to the bracket 56. The gearbox 70 is pivotally connected to the bracket 56 at pivot lugs 80 on each arm of the bracket 56 disposed either side of the gearbox 70.

A drive pinion 60 is mounted on the drive shaft 54 so as to be rotatable by the drive shaft about a drive axis. The drive pinion 60, drive shaft 54 and gearbox 70 are pivotable by a linear actuator (positioner) 58, such as a direct drive roller screw electro mechanical linear actuator, extends between the bracket 56 (at an end nearest the axle 15) and the gearbox 70, or more particularly the housing 84 of the gearbox. Thus, linear movement of the actuator 58 is translated into rotational movement of the gearbox 70 and the drive pinion 60 about the pivot lugs 80. The drive system 50 can therefore be between a neutral configuration (not shown) in which the drive pinion 60 does not mesh with the driven gear 20, and a driven configuration (shown in FIGS. 1, 2 and 3) in which the drive pinion 60 is in meshed engagement with the driven gear 20. In the neutral configuration the wheel 16 is able to rotate freely, e.g. during take-off and landing, while in the driven configuration the wheel 16 can be driven by the drive system 50, e.g. during ground taxiing.

In the embodiment of FIGS. 1 and 2 the driven gear 20 comprises a roller gear 34 and the drive pinion 60 comprises a sprocket.

The roller gear 34 is formed by a rigid annular ring 35 and a series of pins (not shown) projecting from both sides of the annular ring 35. A first series of rollers 36a rotatably supported by the pins is provided on one side of the annular ring 35, and a second series of rollers 36b rotatably supported by the pins as provided on the other side of the annular ring. Each series of rollers 36a, 36b extends around the annular ring to form a continuous track. First and second lateral annular rings 39a, 39b sandwich the first and second series of rollers 36a. 36b. The pins supporting the first series of rollers 36a extend between the annular ring 35 and the first lateral annular ring 39a, and the pins supporting the second series of rollers 36b extend between the annular ring 35 and the second lateral annular ring 39b. The annular ring 35 therefore forms a central spine for supporting the pins which are cantilevered off the central spine. The annular ring 35 comprises a plurality of axially extending connection extension tabs (not shown) providing mounting means for mounting the roller gear 34 to the hub 18. Alternatively, the tabs may be substituted for the annular ring 35.

The drive pinion 60 comprises a sprocket having two coaxial rings of radially extending sprocket teeth which can interlock with the rollers 36 of roller gear 34. That is, each ring of sprocket teeth is arranged to mesh with one of the rings of rollers of the driven gear 20.

Figure 3:
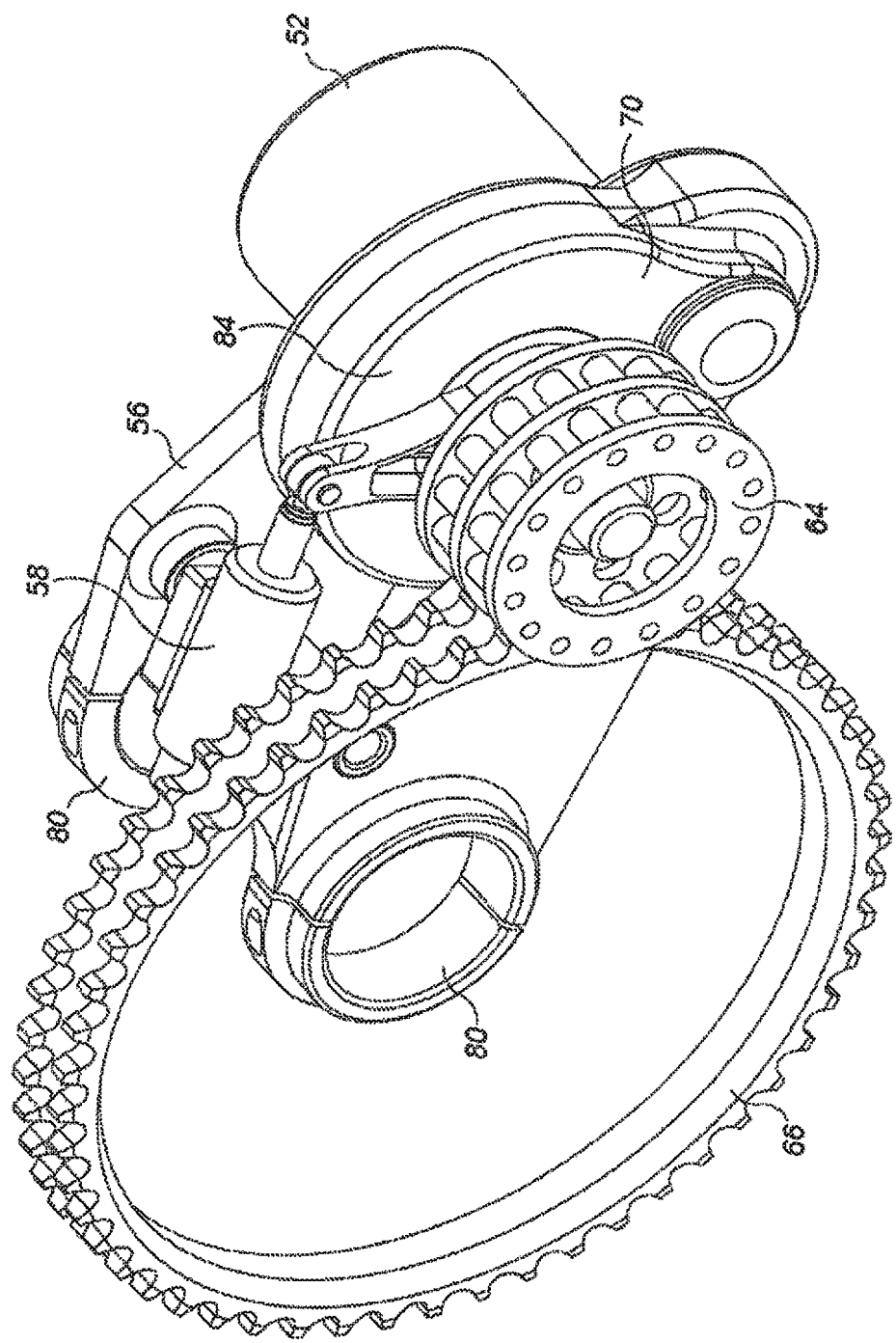
FIG. 3 shows an isometric view of selected components of a drive system according to a second embodiment.

FIG. 3 shows an alternative, and preferred, embodiment in which the driven gear 20 comprises a sprocket instead of a roller gear, and the drive pinion comprises a roller gear instead of a sprocket. Thus, the drive pinion comprises a roller gear 64 having two coaxial rings of rollers and the driven gear 20 is replaced by sprocket 66 having two coaxial rings of sprocket teeth. In all other respects the drive system is identical to that described above with reference to FIGS. 1 and 2, and the features of the drive system described below apply equally to both embodiments. The roller gear 64 may be constructed similarly to the roller gear 34, although of course it has a much smaller diameter and therefore fewer rollers.

An advantage of the sprocket-roller gear arrangement is that it is more tolerant of wheel and axle deformation than meshing toothed gear arrangements. Landing gear wheels and axles are subject to high loads and consequential deformation during ground taxiing, and a driven gear fixed to the wheel will inevitably deform in response to such deformation. Meshing toothed gears are intolerant of such deformation and a typical toothed rim gear may need to be isolated from the wheel via bearings, a flexible interface, or similar.

In contrast, the sprocket and roller arrangement of the present invention may be able to tolerate the deformation without such modification.

Such an arrangement also has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

However, a problem with a sprocket-roller gear arrangement identified by the inventor is that a variation in roller gear velocity occurs with each tooth to roller engagement and disengagement. That is, the torque transfer from the drive pinion to the driven gear is not smooth, but is instead subject to cyclical variations. This torque/velocity variation may lead to undesirable vibration within the landing gear and aircraft wheel during operation of the drive system.

The delivered torque varies both as each roller moves along a tooth profile, and as each roller engages with or disengages from a tooth. This is illustrated in FIGS. 4 to 7, which show an example schematic torque profile and illustrate the roller-sprocket tooth dynamics at various significant parts of that profile. In FIGS. 4 to 7 the roller gear is the drive pinion and the sprocket is the driven gear (as in the embodiment of FIG. 3). The torque profile has a generally 'saw tooth' shape, with each phase (corresponding to the time between each sprocket-roller engagement) containing two maxima (labelled max1 and max2) and two minima (labelled min1 and min2). The skilled person will understand that the illustrated torque profile is merely an example, and that the torque profile, while always having a generally 'saw tooth' shape, may vary with the tooth pitch, the particular shape of the sprocket teeth, the size of the rollers, and many other variables.

As the skilled person will appreciate, the torque transfer between a roller and a sprocket tooth is dependent on the radial distance from the rotational centre of the driven gear at which the force is applied, and the direction in which that force is applied. That is, torque transfer is maximised when the contact point between the roller and sprocket tooth occurs at the largest radial distance from the driven gear (sprocket) centre, and when the force vector at that contact point is orthogonal to the local radius of the driven gear (i.e. tangential to the driven gear). The torque thus varies as these attributes vary.

Figure 4:
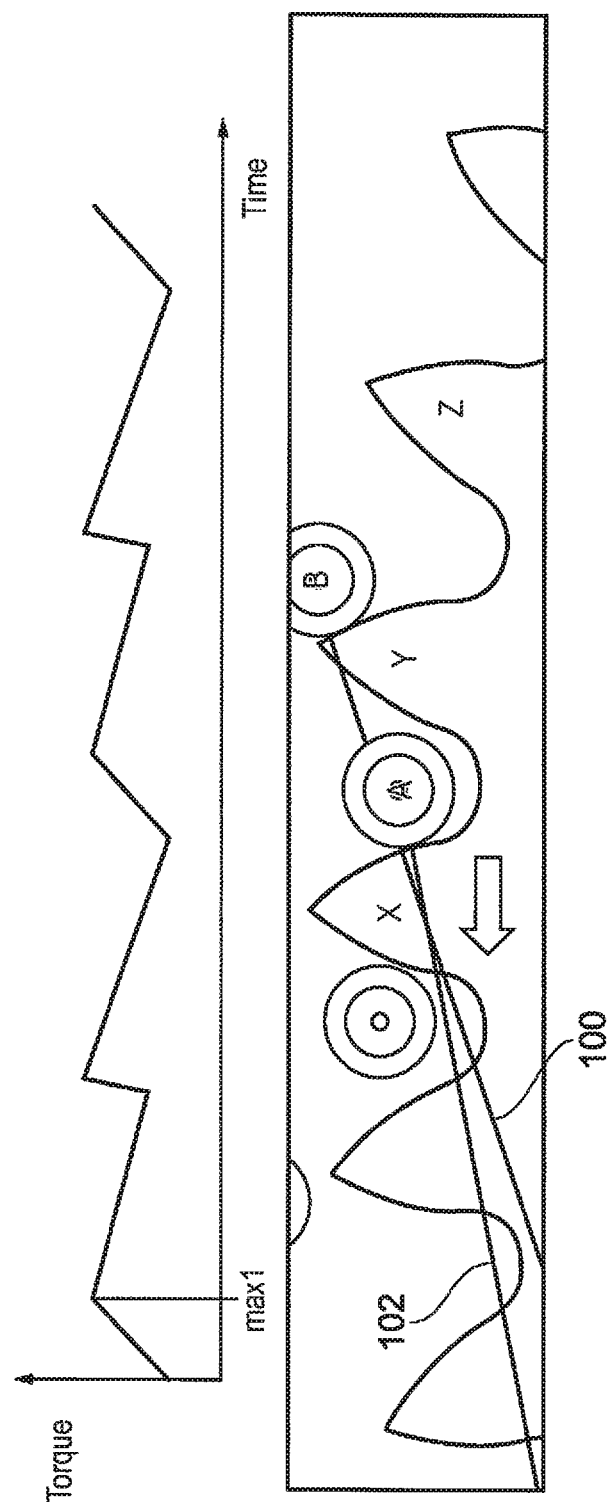
FIGS. 4 to 7 show schematic representations of the torque variations experienced at various stages of a roller gear roller/sprocket tooth engagement cycle.

FIG. 4 shows the relative positions of the rollers and sprocket teeth at the time corresponding to the maximum labelled max1. Here, two rollers A, B are engaged with two sprocket teeth Y, Z, respectively. Force vector 100 indicates the direction of force transfer between roller B and tooth Y, while force vector 102 indicates the direction of force transfer between roller A and tooth X. It can be seen from force vector 100 that roller B is close to its maximum radial distance from the driven gear centre, but has a force vector angle which is substantially lower than 90 degrees to the local radius of the driven gear. Force vector 102 shows that roller A is approaching a minimum radial distance, but has a force vector angle which is near to 90 degrees. The sum of these force vectors 100, 102 provides a torque maximum, max1.

Figure 5:
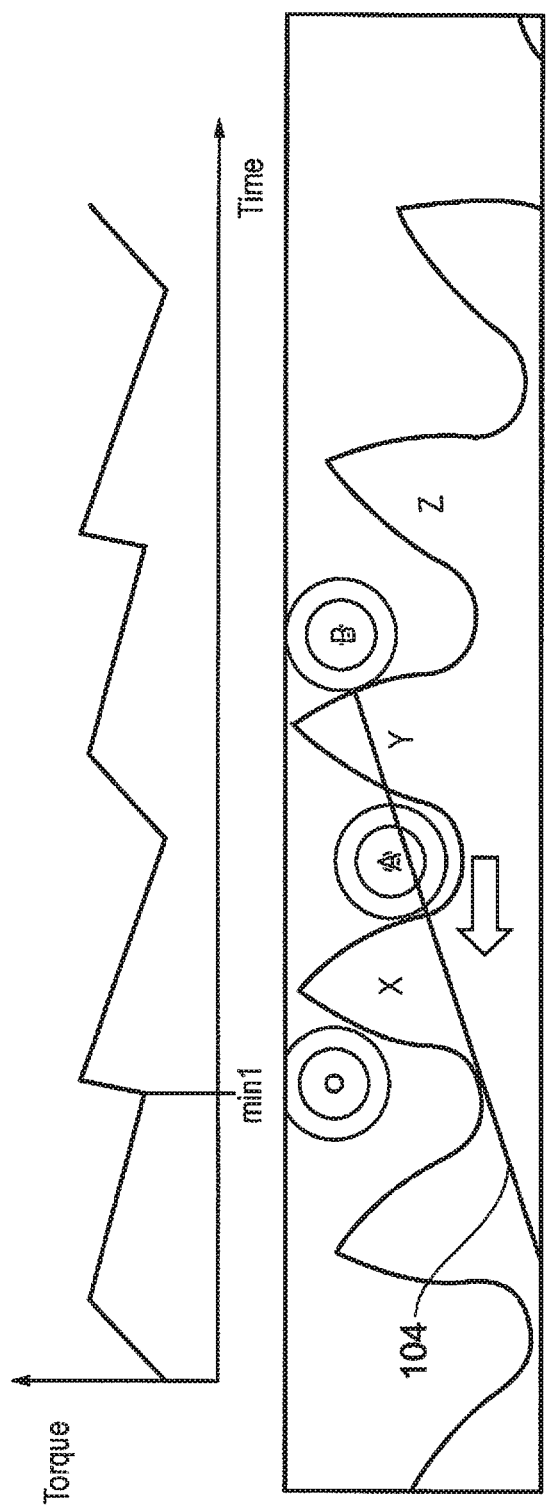

FIG. 5 shows the relative positions of the rollers and sprocket teeth at the torque minimum, min1. Between max1 and min1 roller A has disengaged from tooth X and roller B has maintained engagement with tooth Y but has moved along the tooth profile. Force vector 104 indicates that roller B has moved closer to the driven gear centre, with little change in its force vector angle. As a result of these changes, the torque has decreased to a minimum, min1.

Figure 6:
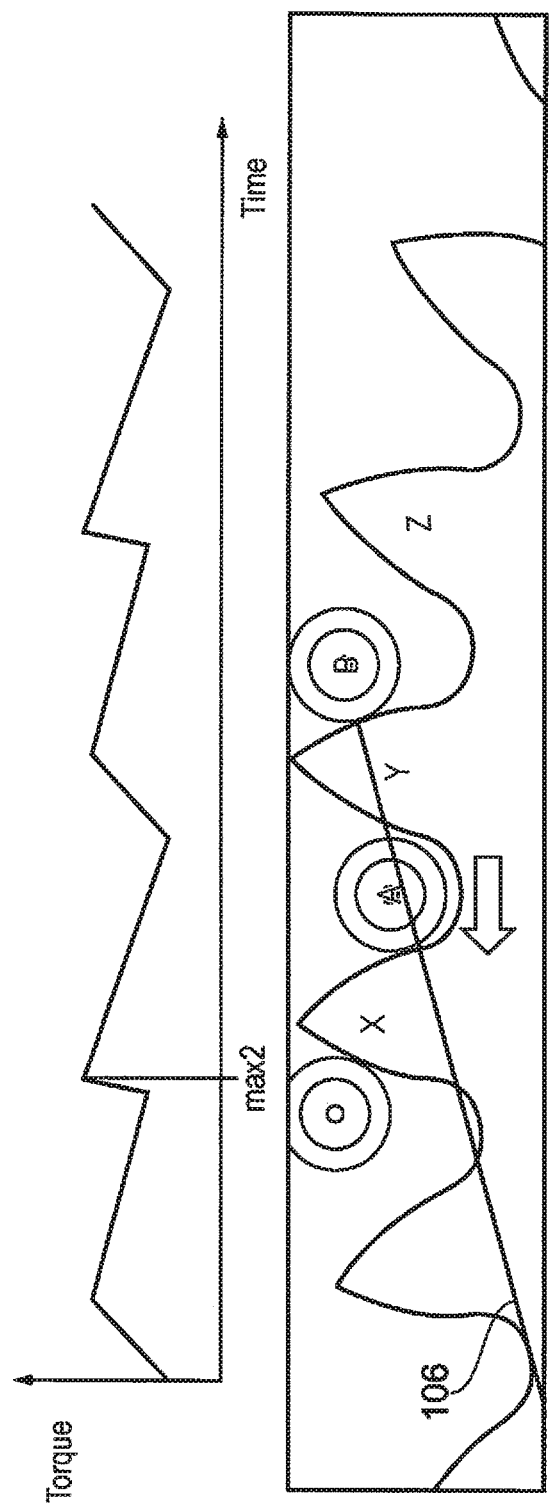

FIG. 6 shows the relative positions of the rollers and sprocket teeth at the second torque maximum, max2. Between min1 and max2 roller B has moved further along the tooth profile of tooth Y. Force vector 106 shows that, although roller B has moved closer to the driven gear centre, its force vector angle has increased to nearer 90 degrees because of a change in the tooth profile shape. These changes have resulted in a torque increase from min1 to max2.

Figure 7:
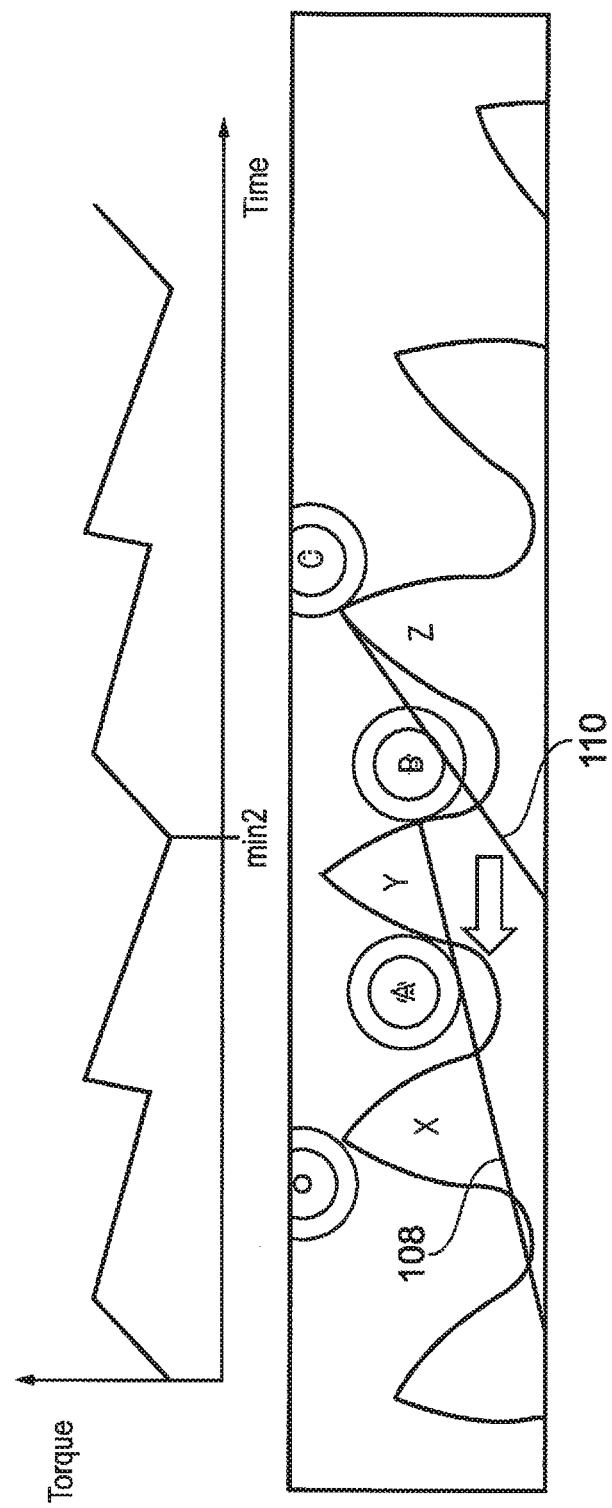

FIG. 7 shows the relative positions of the rollers and sprocket teeth at the second torque minimum, min2. Between max2 and min2 roller B has moved still further along the tooth profile of tooth Y, force vector 108 showing that roller B has moved closer to the driven gear centre but with little change to its force vector angle, resulting in a decrease in transferred torque. Roller C has moved into engagement with tooth Z, force vector 110 showing that its transferred torque is initially low despite its high distance from the driven gear centre, since its force vector angle is substantially lower than 90 degrees.

The fluctuations in torque transfer between the drive pinion and driven gear illustrated in FIGS. 4 to 7 are undesirable in a drive system according to embodiments of the invention because they result in undesirable vibration within the landing gear and drive system during operation of the drive system, as discussed above. The gearbox 70 of the invention provides a simple passive mechanical means for cancelling out, at least in part, such torque fluctuations.

Figure 8:
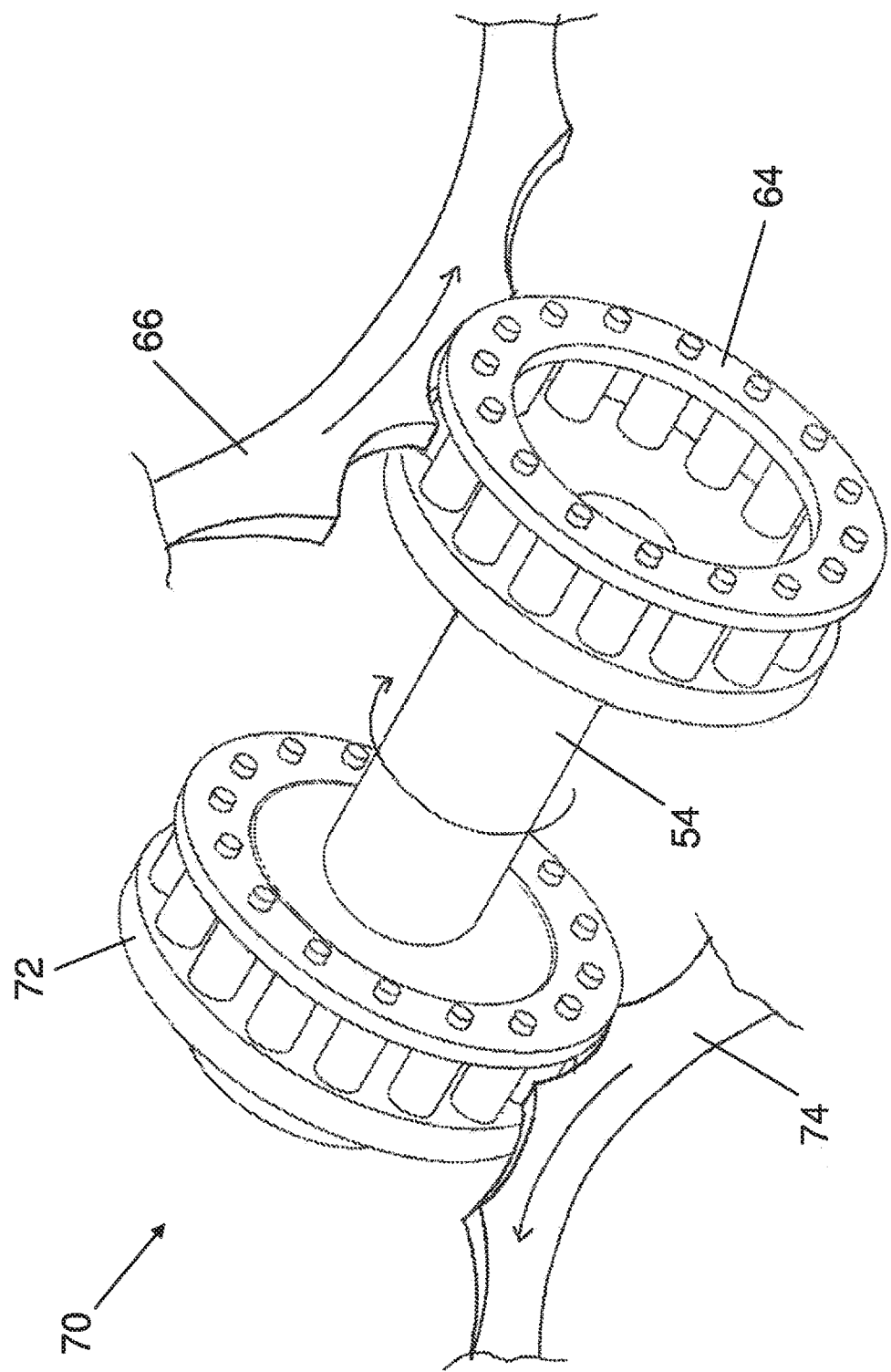
FIG. 8 shows a partial perspective view of selected components of a drive system according to an embodiment of the present invention.
Figure 9:
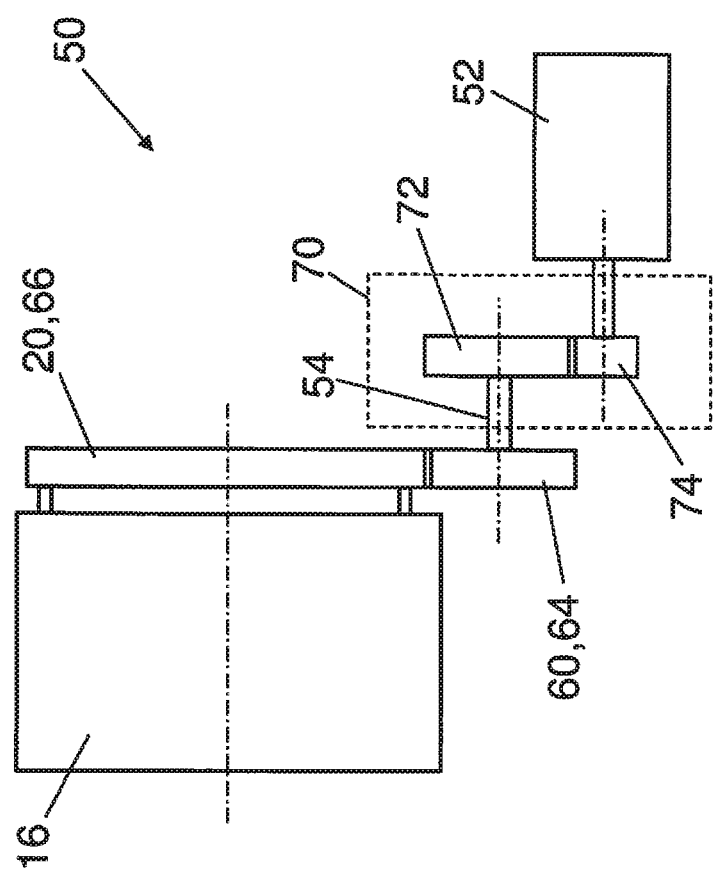
FIG. 9 shows a schematic representation of a drive system according to an embodiment of the present invention.

FIGS. 8 and 9 illustrate an embodiment of the gearbox 70 suitable for providing a drive path between the motor 52 and drive pinion 64 of a drive system 50, such as that shown in FIG. 3, in which the drive pinion comprises a roller gear and the driven gear comprises a sprocket. In FIG. 8 the drive pinion 64 and driven gear 66 are shown as having a single row of rollers and teeth, respectively, but these gears may alternatively be replaced with gears having double rows as shown in FIG. 3. The gearbox 70 includes a first compensating gear 72, which comprises a roller gear that is substantially identical to the roller gear of the drive pinion 64. In other embodiments the roller gear of the first compensating gear 72 may have fewer rollers (and thus a smaller diameter) than the drive pinion 64 in order to provide a gear reduction ratio, but the pitch between rollers should remain substantially identical and the rollers have a corresponding, or substantially identical, profile (i.e. shape). The first compensating gear 72 is mounted on the drive shaft 54 and thus rotates in tandem with the drive pinion 64.

The gearbox 70 also includes a second compensating gear 74, which comprises a sprocket which is meshed with the first compensating gear 72. In the illustrated embodiment the sprocket of the second compensating gear 74 has fewer teeth (and thus a smaller diameter) than the sprocket of the driven gear 66. This is both to enable the second compensating gear 74 to fit within the gearbox 70 and to provide a gear reduction ratio. Such a gear reduction ratio is desirable in ground taxi configurations of the drive system 50. The teeth of the second compensating gear 74 have a pitch which is substantially identical to that of the sprocket of the driven gear 66, and tooth profile shapes which correspond to, or are substantially identical to, those of the sprocket of the driven gear 66.

A result of the above-described arrangement of the gearbox 70 is that the first 72 and second 74 compensating gear engagement acts to drive the drive shaft 54, while the drive pinion 64 and driven gear 66 engagement is driven by the drive shaft 54. That is, the sprocket of the second compensating gear 74 drives the roller gear of the first compensating gear 72, while the sprocket of the driven gear 66 is driven by the roller gear of the drive pinion 64.

In the illustrated embodiment the gearbox 70 is arranged so that in the driven configuration (shown in FIGS. 8 and 9), the meshing engagement between the drive pinion 64 and driven gear 66 is out of phase with the meshing engagement between the first compensating gear 72 and the second compensating gear 74. As discussed above, one phase is considered to be the time period between each roller-sprocket tooth engagement. Thus, to achieve the described out of phase engagement, each roller-tooth engagement of the first 72 and second 74 compensating gears must occur at a time between roller-tooth engagements of the drive pinion 64 and driven gear 66.

This out of phase engagement is, at least in part, a result of the arrangement in which the sprocket of the second compensating gear drives the roller gear of the first compensating gear, while the sprocket of the driven gear is driven by the roller gear of the drive pinion. The two engagement mechanisms thus mirror one another, as discussed further below. The engagement of the two gear sets may be further phase shifted by other means, for example by mounting the drive pinion 64 and the first compensating gear 72 on the drive shaft 54 so that the two roller gears are out of angular alignment with one another. The skilled person will be aware of many alternative arrangements for achieving the out of phase engagement.

Figure 10:
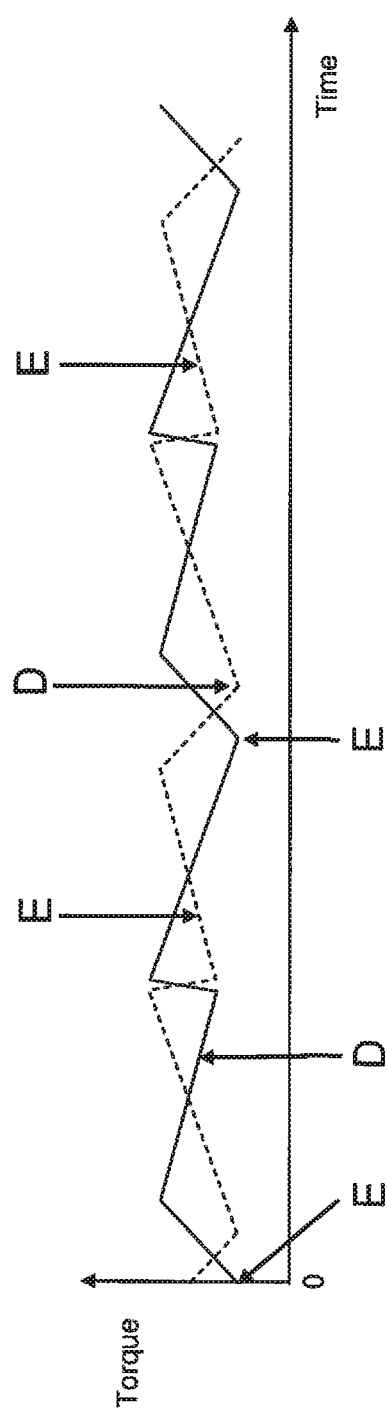
FIG. 10 shows a schematic representation of the torque variations resulting from the drive pinion/driven gear engagement (solid line) and the first and second compensating gear engagement (broken line) in a drive system according to an embodiment of the invention.

FIG. 10 illustrates the effect of the out of phase arrangement. The torque variation caused by the meshing engagement between the drive pinion 64 and driven gear 66 is indicated by a solid line (the profile being identical to that previously described in relation to FIGS. 4 to 7), while the torque variation caused by the meshing engagement between the first 72 and second 74 compensating gears is indicated by a broken line. The approximate locations on each torque profile at which roller-tooth engagement occurs are labelled E, and the approximate locations at which roller-tooth disengagement occurs are labelled D.

The torque profile of the compensating gears (broken line) is simply the inverse in the time direction of the torque profile of the drive pinion and driven gear (solid line). This is because, while the dynamics of the roller-teeth engagements are substantially identical, the sprocket of the second compensating gear 74 drives the roller gear of the first compensating gear 72, while the sprocket of the driven gear 66 is driven by the roller gear of the drive pinion 64. Thus, a feature on the torque profile of the drive pinion and driven gear (solid line) which represents a roller-tooth engagement corresponds to a roller-tooth disengagement on the torque profile of the compensating gears (broken line), and vice versa. As can be seen from FIG. 10, the torque profile of the compensating gears (broken line) is phase shifted to a sufficient degree with respect to the torque profile of the drive pinion and driven gear (solid line) so that, as far as is possible, the maxima of one profile are cancelled out by the minima of the other profile. The summed result (not shown) is a smoother, less fluctuating, torque delivery. Thus, vibrations caused by fluctuations in the transfer of torque between the drive pinion and the driven gear are experienced only within the drive shaft 54, and are prevented from being transmitted through the drive train to the landing gear by the compensating torque fluctuations between the first 72 and second 74 compensating gears.

In alternative embodiments the gearbox 70 may include further gears, such as toothed spur gears, in order to provide a desired gearing ratio. In other embodiments the first compensating gear 72 and/or second compensating gear 74 may not have any influence on the overall gear ratio of the gearbox 70, and may be implemented as idler gears.

The description of the gearbox 70 above relates to the illustrated embodiment of FIG. 8 which is suitable for use in the drive system of FIG. 3, but it will be understood that the invention extends to an alternative embodiment suitable for use in the drive system of FIGS. 1 and 2, in which the first compensating gear 72 comprises a sprocket corresponding to the sprocket of the drive pinion 60, and the second compensating gear 74 comprises a roller gear corresponding to the roller gear of the driven gear 20. In yet further embodiments, the first compensating gear may comprise a roller gear and the drive pinion may comprise a sprocket, or vice versa. Thus, the first compensating gear 72 may comprise a sprocket corresponding to the sprocket of the driven gear 66 and the second compensating gear may comprise a roller gear corresponding to the roller gear of the drive pinion 64. Similarly, the first compensating gear 72 may comprise a roller gear corresponding to the roller gear of the driven gear 20 and the second compensating gear may comprise a sprocket corresponding to the sprocket of the drive pinion 60. In all variations the tooth/roller pitch and profile should remain substantially the same throughout.

Figure 12:
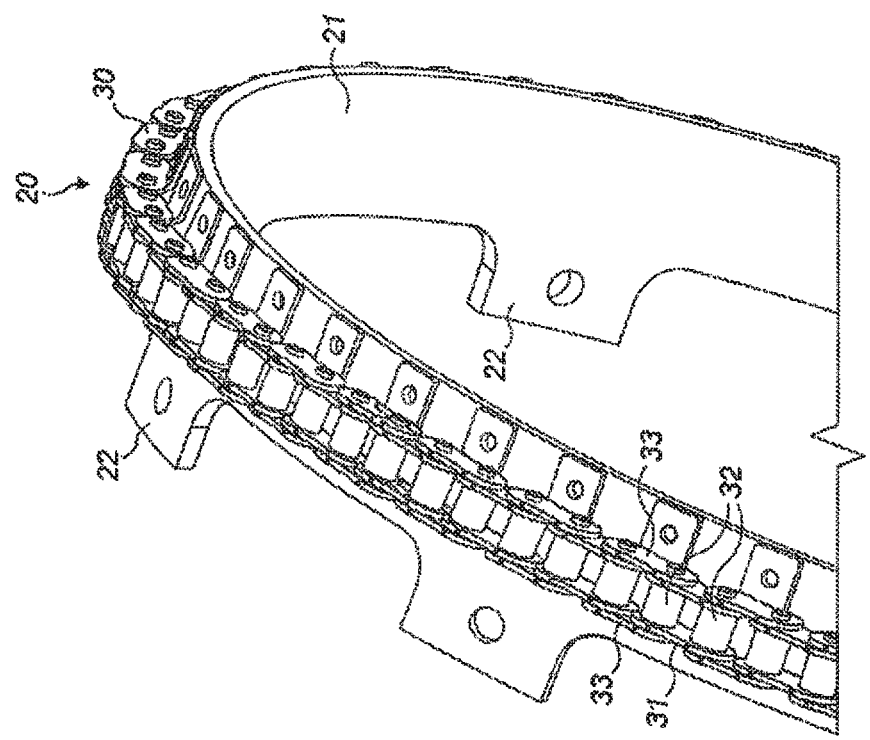
FIG. 12 shows an isometric view of an alternative driven gear of the drive system of FIG. 11.
Figure 11:
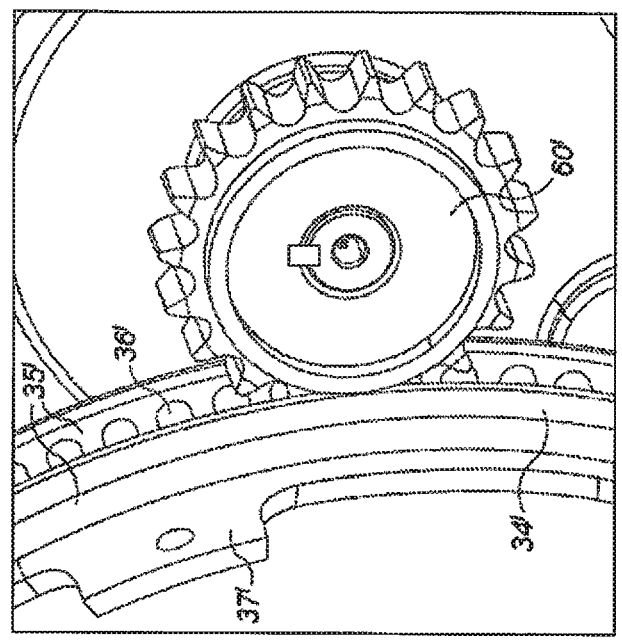
FIG. 11 shows an isometric detail view of selected components of the drive system of FIG. 1 with an alternative drive pinion and driven gear.

In variations to the embodiments described above, the drive pinion may be formed as a sprocket 60' (see FIG. 11) having a single row of teeth, and the driven gear may be formed as a roller gear having a single row of rollers. The roller gear may take many forms, including the roller gear 34' of FIG. 11 and the roller chain gear 20 variant of FIG. 12. In the roller chain gear 20 of FIG. 12 a roller chain 30 extends around a rigid annular extension ring 21. The roller chain 30 is driven by a single sprocket (not shown) similar to the sprocket 60'. The extension ring 21 (or drum) is rigidly attached to the hub 18 via a plurality of extension tabs 22 so that it extends from an outer circumference of the hub 18 towards the leg 12. A roller chain 30 is fixed around the outer circumference of the extension ring 21 so that it forms a continuous track around the ring 21. The roller chain 30 comprises multiple interlinked chain elements 31, each comprising a sub-assembly of two rollers 32 mounted on parallel axes. Each roller 32 is rotatable about a bush (not shown) which is itself mounted on a pin (not shown). Each chain element 31 is pivotally mounted to its neighbouring element by a pair of link elements 33 so that the rollers 32 are arranged to form a continuous track, or series, and each element 31 is thus designed to be able to rotate relative to its neighbour. Of course, since the roller chain 30 is fixed to the extension ring 21, the chain elements 31 are prevented from pivoting relative to one another. The driven gear may include a plurality of multiple coaxial chains engagable by a pinion formed by multiple coaxial sprockets.

Figure 14:
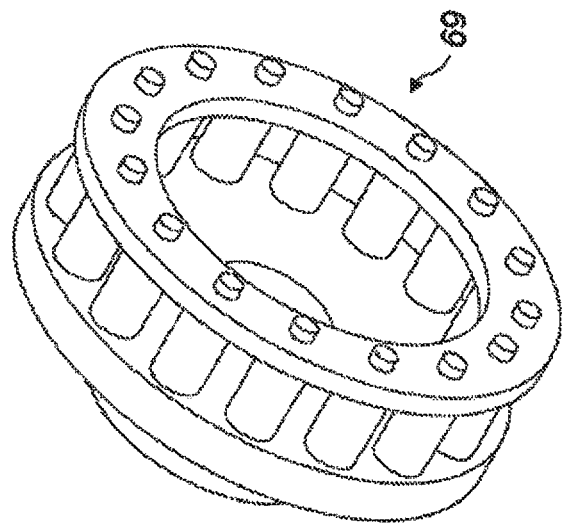
FIGS. 13 and 14 show isometric views of alternative drive pinions.
Figure 13:
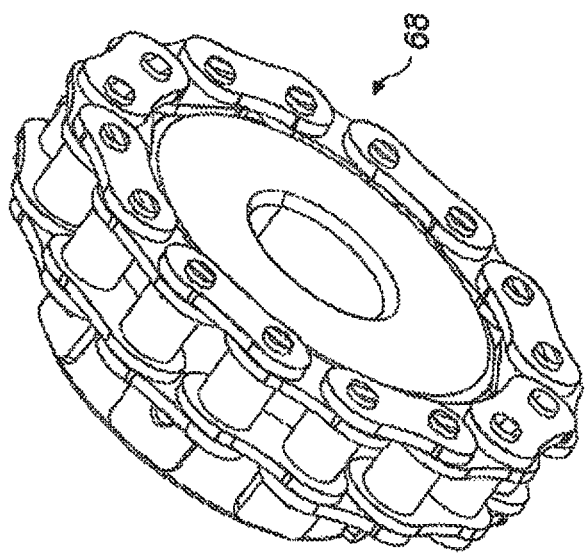

In a further variation, illustrated in FIGS. 13 and 14, the drive pinion may alternatively comprise a single ring of rollers for engaging with a driven gear formed as a sprocket (not shown) having a single row of sprocket teeth. The roller gear may take many forms, including a typical roller gear such as roller gear 69 in FIG. 14, or a roller chain gear 68 such as that shown in FIG. 13.

The embodiments described above are suitable only for ground taxiing operations but could be modified (e.g. by adjustment of the gearbox ratio) to be suitable for only pre-landing spin-up operations. In the taxiing configuration the linear actuator 58 (which may be back drivable) may be torque controlled (or current controlled) to apply a substantially constant load between the drive pinion 60 and the driven gear 20, thereby allowing for some deformation of the various component parts of the drive system 50 while at the same time preventing unwanted separation. An electro mechanical brake (not shown), or other similar blocking device, may be integrated within the actuator 58 to lock the actuator in the disengaged (second) configuration.

In each of the arrangements described above the principle of achieving drive via meshing between a sprocket and roller gear/roller chain can be applied when the driven gear comprises the sprocket and the drive pinion comprises the roller gear/roller chain, and vice versa.

Although the figures only show features of the drive system 50 for driving one of the wheels 16, it is envisaged that these features may be mirrored for the other wheel 16. That is, it is envisaged that one drive system 50 may be provided for each wheel 16. For a landing gear 10 with four or more wheels 16, a drive system 50 may be provided for each of the wheels 16, or for only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft of the gearbox 70 of each drive system.

Although the figures only show the drive system 50 supported by a bracket 56 which is rigidly connected to the axle 14 of the landing gear, the drive system 50 may alternatively be mounted on the upper telescopic part 12a (main fitting) or lower telescopic part 12b (slider).

Although the invention has been described above with reference to one or more preferred embodiments, it will be appreciated that various changes or modifications may be made without departing from the scope of the invention as defined in the appended claims.

The invention claimed is:

1. A drive system for rotating a wheel of an aircraft landing gear, the drive system including:
   a motor operable to rotate a drive pinion via a drive path; and
   a driven gear adapted to be attached to the wheel so as to be capable of rotating the wheel,
   wherein:
   the drive system has a drive configuration in which the drive pinion is capable of meshing with the driven gear to permit the motor to drive the driven gear via the drive path;
   the drive path comprises a first compensating gear and a second compensating gear which is meshed with the first compensating gear;
   one of the drive pinion and the driven gear comprises a roller gear having a series of rollers arranged to form a ring, each roller being rotatable about a roller axis, and the other of the drive pinion and the driven gear comprises a sprocket; and
   one of the first compensating gear and the second compensating gear comprises a roller gear having a series of rollers arranged to form a ring, each roller being rotatable about a roller axis, and the other of the first compensating gear and the second compensating gear comprises a sprocket.

2. A drive system according to claim 1, wherein either:
   the drive pinion and the first compensating gear each comprise a roller gear having a series of rollers arranged to form a ring, each roller being rotatable about a roller axis, and the driven gear and the second compensating gear each comprise a sprocket; or
   the drive pinion and the first compensating gear each comprise a sprocket and the driven gear and the second compensating gear each comprise a roller gear having a series of rollers arranged to form a ring, each roller being rotatable about a roller axis.

3. A drive system according to claim 1, wherein the drive system is configured such that, when the motor drives the driven gear via the drive path in the drive configuration, there is a first oscillation in torque transmitted from the drive pinion to the driven gear and a second oscillation in torque transmitted from the second compensating gear to the first compensating gear, the second oscillation tending to counteract the first oscillation.

4. A drive system according to claim 3, wherein the drive system is configured such that the second oscillation has a maximum which coincides with a minimum in the first oscillation, or vice versa.

5. A drive system according to claim 3, wherein the first and second oscillations are each periodic, and a period of the first oscillation is an integer multiple of a period of the second oscillation.

6. A drive system according to claim 1, wherein the second compensating gear has fewer teeth or rollers, respectively, than the first compensating gear to achieve a gear reduction ratio.

7. A drive system according to claim 1, wherein the drive path is configured such that, in the drive configuration, each tooth to roller engagement between the first compensating gear and the second compensating gear is out of phase with each tooth to roller engagement between the drive pinion and the driven gear.

8. A drive system according to claim 1, wherein the first compensating gear is mounted on the common drive path such that it is out of rotational alignment with the drive pinion.

9. A drive system according to claim 1, wherein a pitch between rollers or teeth, respectively, of the drive pinion and driven gear is substantially equal to a pitch between rollers or teeth, respectively, of the first compensating gear and second compensating gear.

10. A drive system according to claim 1, wherein the rollers of the drive pinion or driven gear have substantially the same profile as the rollers of the first compensating gear or second compensating gear.

11. A drive system according to claim 1, wherein the teeth of the drive pinion or driven gear have substantially the same profile as the teeth of the first compensating gear or second compensating gear.

12. A drive system according to claim 1, wherein the drive system is switchable between the drive configuration and a neutral configuration in which the drive pinion is not capable of meshing with the driven gear.

13. A drive system according to claim 1, wherein the first compensating gear is mounted on a common drive shaft with the drive pinion so as to be capable of rotating in tandem with the drive pinion.

14. An aircraft landing gear comprising a wheel and a drive system according to claim 1, wherein the driven gear of the drive system is attached to the wheel so as to be capable of rotating the wheel.

15. A method of rotating a wheel of an aircraft landing gear with the drive system of claim 1, the method comprising:
   operating the motor to drive the driven gear via the drive path;

transmitting torque from the drive pinion to the driven gear, wherein there is a first oscillation in the torque transmitted from the drive pinion to the driven gear; and transmitting torque from the second compensating gear to the drive pinion via the first compensating gear and the common drive shaft, wherein the first and second compensating gears introduce a second oscillation in the torque transmitted from the second compensating gear to the drive pinion which tends to counteract the first oscillation.

16. A drive system according to claim 13, wherein the drive system is supported by a bracket which is rigidly connected to the axle, main fitting or slider part of the landing gear.

17. A drive system according to claim 16, wherein the bracket includes two lugs comprising half-moon clamps to permit ready attachment and detachment of the bracket.

* * * * *